Patented Nov. 13, 1951

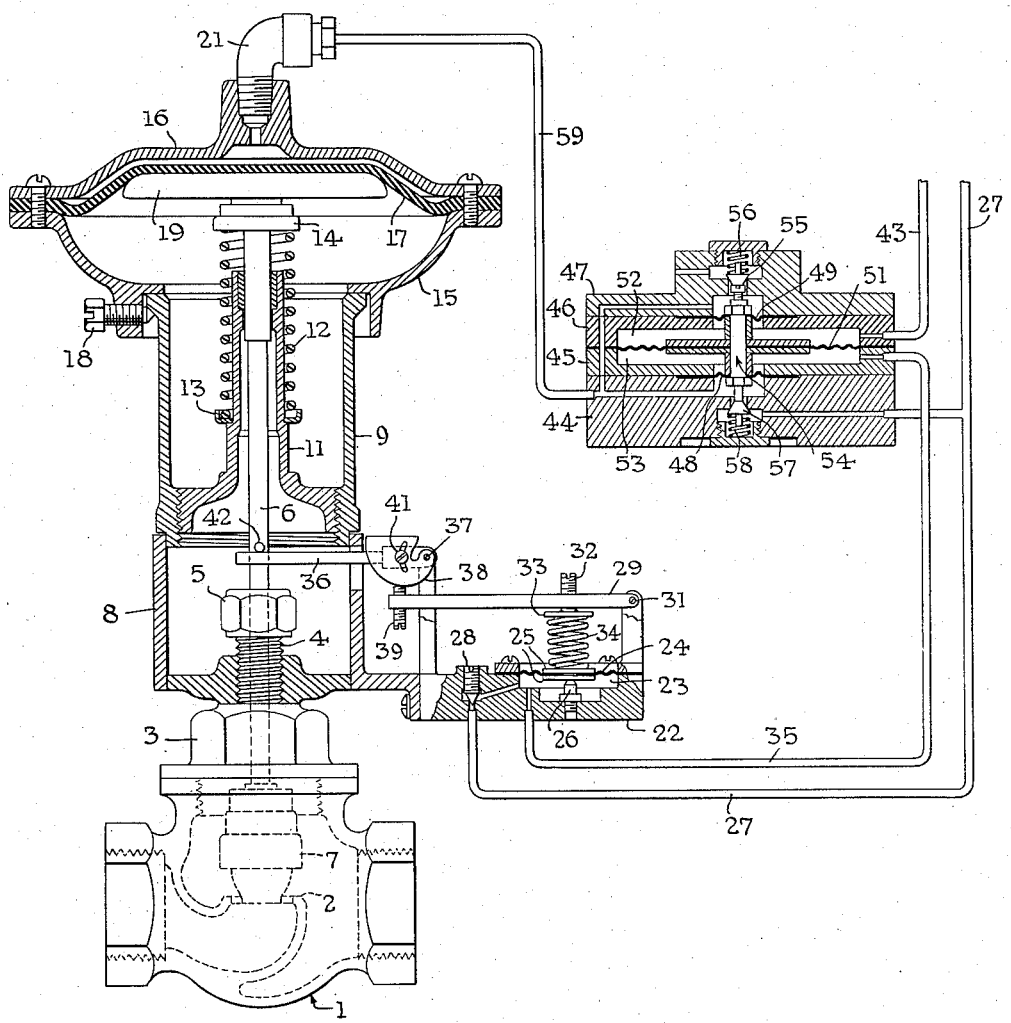

2,575,085

UNITED STATES PATENT OFFICE 2,575,085

PRESSURE FLUID FOLLOW-UP MOTOR WITH PILOT PRESSURE CONTROL

Harold W. Alyea, Waukesha, Wis., assignor to Johnson Service Company, Milwaukee, Wis., a corporation of Wisconsin Application July 18, 1945, Serial No. 605,738

2 Claims. (Cl. 121—41)

This invention relates to "pilot positioners," a term used in the ventilating and heating industry to describe a motor which positions a valve, damper or other device in accordance with variations of a pilot pressure.

The simplest form is a single-acting spring biased diaphragm motor which will assume different positions according to the pilot pressure acting on the motor. Such a motor has considerable internal friction, so that its responses are not precise. Another disadvantage is that the loading spring must be adjusted to change its operating characteristics despite the fact that it is not convenient to make the spring readily accessible. Indeed, such devices are commonly located in notably inaccessible spots.

According to the invention, use is made of a single-acting, spring biased bellows motor, but the spring does not determine response and hence need never be adjusted. Instead, a simple pressure controlling valve and variable ratio relay are combined to produce what is in effect a follow-up valve mechanism. This converts the device into a sensitive, precisely operating servomotor, whose characteristics can readily be changed to suit almost any desired pattern of response.

The motor can be used to position various devices, but as a simple example of one such device, a valve has been selected for illustration.

In the drawing the single view shows the valve and its actuating motor part in axial section and part in elevation (in wide open position). The pressure controlling valve and the relay are drawn in axial section.

The valve is an ordinary globe valve having a body 1, seat 2, bonnet 3 with threaded neck 4, and gland nut 5 coacting with a gland (not shown) in the neck. The valve stem 6 is slidable through the gland and carries the valve 7 toward and from seat 2.

A housing 8 is threaded on neck 4 below the gland nut, and carries a second cylindrical housing 9. Screwed into housing 9 is a stem guide 11 in which the upper end of stem 6 is guided. A coil compression spring 12 is confined between an annular seat 13 and head 14 at the upper end of stem 6. In this way the valve is spring-biased in an opening direction, the spring-loading being adjustable by adjustment of the stem guide 11 in its threaded mounting.

The diaphragm motor comprises a bottom housing 15 and a top housing 16 clamped together upon the margin of a flexible diaphragm 17 by screws as shown. Housing 15 is attached to housing 9 by a series of cone pointed screws, one of which is shown at 18 in the drawing. Head 14 carries a thrust disc 19, engaged by the central portion of the diaphragm 17. Operating fluid under pressure (conventionally compressed air) is admitted to and exhausted from the space above the diaphragm through a connection 21.

The mechanism so far described will be recognized as a familiar form of diaphragm-operated valve. The stem 6 could be connected to shift any part or device requiring to be positioned according to variations of a pilot pressure. In prior practice the pilot pressure acted through connection 21.

Mounted on a portion of housing 8 is the body 22 of an adjustable, pressure-controlling valve. Body 22 contains a chamber 23 whose open side is closed by a flexible metallic diaphragm 24. This carries attached to its center a pair of stiffening plates 25, one above and the other below the diaphragm. The lower one of these coacts as a valve with the end of leak nozzle 26 to control a restricted vent from chamber 23 to the atmosphere.

A supply line 27 supplies air at say 15 pounds per sq. inch gage pressure to restrictor valve 28, which is so adjusted that its flow capacity under that pressure is less than the venting capacity of nozzle 26 when the latter is wide open. Air passing valve 28 flows into chamber 23. A lever 29 is hinged at 31 to body 22 and carries an adjusting screw 32 which engages spring seat 33. A coil compression spring 34 is confined between seat 33 and the upper plate 25 at the center of diaphragm 24. The stress imposed on spring 34 determines the pressure developed in chamber 23 and consequently in line 35 which communicates with that chamber.

The stress on spring 34 is adjusted according to the position of stem 6. To accomplish this a lever 36 is hinged at 37 to body 22 and carries a progressive spiral cam 38 which reacts upon an adjustable thrust screw 39 carried by the end of lever 29. The cam 38 is angularly adjustable about the axis of hinge 37 and may be clamped in adjusted positions by screw 41. Its preferred form will be discussed hereinafter. A pin 42 on stem 6 engages lever 36 near its end.

The rate at which pressure in line 35 varies as stem 6 moves may be changed by shifting cam 38. Or, if preferred, differently formed cams may be interchanged. The thrust screws 32 and 39 also permit zeroing adjustments of pressure in line 35, as will be obvious upon consideration of the mechanism.

The pilot pressure acts in line 43. This would commonly be the branch line of a pneumatic thermostat or humidostat, but pilot pressure in line 43 could be any pressure regulable within an appropriate range. In prior art devices as usually constructed, the pilot pressure acted through connection 21 in diaphragm 17, but in the present invention, the pilot pressure in line 43 and the controlled pressure in line 35 conjointly control a relay and the relay affords a derived pressure which is a function of the pilot pressure in line 43 and of the position of stem 6, expressed in terms of pressure in line 35. This derived pressure acts through connection 21 on diaphragm 17.

The housing for the relay is made in four parts 44, 45, 46 and 47 between which the margins of the small diaphragms 48 and 49 and the large diaphragm 51 are clamped. Diaphragm 51 is the main relay diaphragm whereas 48 and 49 function as packless glands.

Diaphragm 51 separates a pilot pressure chamber 52 to which pilot line 43 leads from a counter-pressure chamber 53 to which line 35 leads. Sealed to the centers of all three diaphragms is a hub structure designated generally by the numeral 54.

In housing part 47 is an outward-opening exhaust poppet valve 55, which is urged closed by spring 56. It controls a vent to atmosphere. In housing part 44 is an inlet poppet valve 57 urged closed by spring 58.

In the mid-position of hub structure 54 both valves 55 and 57 are closed. The valve 57 controls flow from supply line 27 to line 59 which leads to connection 21. Valve 55 controls exhaust flow from line 59 to atmosphere. The connections are clearly shown in the drawings. Since the outer faces of the two small diaphragms 48 and 49 are subject to the same pressure (i. e., that in line 59), they introduce no disturbing effect.

The relay (parts 44—58) is not herein claimed broadly but is claimed in application Serial No. 683,265, filed July 12, 1946, by the present applicant.

*Operation.*—If pressure in line 43 rises above that in line 35, hub 54 moves downward opening supply valve 57. This increases pressure in line 59 so that diaphragm 17 and stem 6 are forced downward. This increases the stress on spring 34 and consequently causes pressure in line 35 and chamber 53 to rise. When pressure balance is re-established stem 6 will stop moving.

If pressure in line 43 falls, exhaust valve 55 will be opened. This exhausts air from line 59 so that diaphragm 17 and stem 6 move upward with attendant reduction of stress on spring 34 and consequent reduction of pressure in line 35 and chamber 53.

The most significant advantage of the invention is that it relieves limitations formerly imposed on design and adjustment. Spring 12 need be only sufficient to move the actuated device, and diaphragm 17 need be only large enough to overpower spring 12 and move the actuated device when the diaphragm is subjected to the available supply pressure. This means that the motor can be standardized.

The cam 38 is shown as designed for a uniform depression of screw 38 for uniform increment of valve stem travel, but the amount of depression is adjustable. Consequently the extent of the operating range of pilot pressure is adjustable.

Screw 32 determines the initial loading of spring 34 and adjusts the control point. If special characteristics are desired cam 38 can be given appropriate special forms.

The pressure-controlling valve is accessible and readily adjustable. The relay can be remotely located. It embodies mechanical features which have been used successfully in other relations, so that its performance is predictable.

Other types of pressure controlling valves are known and some could be substituted for that selected for illustration. The same is true as to the relay, and the diaphragm motor.

What is claimed is:

1. The combination of a source of elastic pressure fluid; a single-acting expansible chamber motor; spring means opposing the motion of said motor under pressure; a connection in which a variable pilot pressure is developed; means forming a secondary pressure chamber one wall of which is a flexible diaphragm, there being a restricted port and a leak port one of which controls venting of the chamber and the other of which controls supply of pressure fluid from said source to said chamber, the leak port being arranged to be variably throttled by displacement of the diaphragm; a loading spring reacting on said diaphragm; means operated by motion of the expansible chamber motor for varying the loading of said spring as said motor moves; a relay motor urged in opposite directions by said pilot pressure and pressure in said secondary pressure chamber; and admission and exhaust valve means supplied with pressure fluid by said source connected with said single acting motor to control pressure in the latter, and arranged to be actuated by said relay motor.

2. The combination defined in claim 1 in which the means for varying the loading of the spring comprises a lever, a spiral cam angularly adjustable relatively to the lever, and a second lever interposed between the cam and the spring.

HAROLD W. ALYEA.

REFERENCES CITED

The following references are of record in the file of this patent:

UNITED STATES PATENTS

| Number | Name | Date |
| --- | --- | --- |
| 1,231,257 | Herr | June 26, 1917 |
| 1,666,270 | Soderberg | Apr. 17, 1928 |
| 1,917,092 | Bristol | July 4, 1933 |
| 1,961,343 | Donaldson | June 5, 1934 |
| 2,176,603 | Belaef | Oct. 17, 1939 |
| 2,177,098 | Doe | Oct. 24, 1939 |
| 2,179,450 | Gorrie | Nov. 7, 1939 |
| 2,350,615 | Joesting | June 6, 1944 |
| 2,401,680 | Eaton | June 4, 1946 |

FOREIGN PATENTS

| Number | Country | Date |
| --- | --- | --- |
| 459,893 | Great Britain | Jan. 18, 1937 |